United States Patent
Hammer

(10) Patent No.: US 7,326,264 B2
(45) Date of Patent: Feb. 5, 2008

(54) PLASMA PARTICULATE FILTER

(75) Inventor: Thomas Hammer, Hemhofen (DE)

(73) Assignee: Siemens Aktiengesellschaft, Munich (DE)

( * ) Notice: Subject to any disclaimer, the term of this patent is extended or adjusted under 35 U.S.C. 154(b) by 531 days.

(21) Appl. No.: 10/522,853

(22) PCT Filed: Jul. 1, 2003

(86) PCT No.: PCT/DE03/02187

§ 371 (c)(1),
(2), (4) Date: Jan. 31, 2005

(87) PCT Pub. No.: WO2004/004869

PCT Pub. Date: Jan. 15, 2004

(65) Prior Publication Data

US 2006/0010843 A1    Jan. 19, 2006

(30) Foreign Application Priority Data

Jul. 3, 2002  (DE) ................ 102 29 881

(51) Int. Cl.
- *B01D 46/00* (2006.01)
- *B01D 53/34* (2006.01)
- *B01D 53/46* (2006.01)
- *F01N 3/023* (2006.01)
- *F01N 3/027* (2006.01)

(52) U.S. Cl. ............... 55/282.3; 55/282.2; 55/385.3; 55/523; 55/DIG. 10; 55/DIG. 30; 60/275; 60/295; 60/297; 60/311; 261/30; 423/212; 422/186.04; 422/186.1

(58) Field of Classification Search ............ 55/282.2, 55/282.3, 385.3, 523, DIG. 10, DIG. 30; 60/275, 295, 297, 300, 301, 303, 311; 261/30; 423/212, 213.2; 422/186.03, 186.04, 186.1

See application file for complete search history.

(56) References Cited

U.S. PATENT DOCUMENTS

| | | | | |
|---|---|---|---|---|
| 4,897,096 | A | * | 1/1990 | Pischinger et al. ........... 55/523 |
| 5,207,807 | A | * | 5/1993 | Manfre et al. ................ 55/523 |
| 5,827,407 | A | * | 10/1998 | Wang et al. ................ 204/164 |
| 6,461,398 | B2 | * | 10/2002 | Peters et al. .................. 55/523 |
| 6,660,068 | B1 | * | 12/2003 | Garner et al. ............. 55/282.3 |

FOREIGN PATENT DOCUMENTS

| | | | |
|---|---|---|---|
| DE | 37 05 979 A1 | | 9/1988 |
| DE | 37 15 174 A1 | | 11/1988 |
| DE | 42 30 631 A1 | | 3/1994 |
| DE | 100 57 862 C1 | * | 2/2002 |
| FR | 2 842 389 | * | 1/2004 |
| JP | 2001-173427 | | 6/2001 |
| JP | 2001-276561 | * | 10/2001 |
| JP | 2004-340049 | * | 12/2004 |

\* cited by examiner

*Primary Examiner*—Jason M. Greene
(74) *Attorney, Agent, or Firm*—Staas & Halsey LLP

(57) ABSTRACT

A method for reducing the particulate emissions containing carbon of diesel motors uses surface discharges to regenerate a filter. An appropriate wall flow filter is configured from alternately closed longitudinal channels. The electrodes are embedded in the filter material and are thus protected from erosion. Two electrodes are sufficient for selectively generating the surface discharges in the inlet channel of the wall flow filter as a result of a suitable geometric arrangement.

18 Claims, 3 Drawing Sheets

US 7,326,264 B2

PLASMA PARTICULATE FILTER

CROSS REFERENCE TO RELATED APPLICATIONS

This application is based on and hereby claims priority to PCT Application No. PCT/DE2003/002187 filed on Jul. 1, 2003 and German Application No. 102 29 881.5, the contents of which are hereby incorporated by reference.

BACKGROUND OF THE INVENTION

The invention relates to a plasma particulate filter.

DE 100 57 862C1 discloses a plasma particulate filter and a method for reducing the levels of carbon-containing particulate emissions from diesel engines, in which the particulates contained in the exhaust gas are deposited on filter surfaces, the deposited particles being oxidized in order to regenerate the filter, and the regeneration being effected by non-thermal, electrical sliding surface discharges at the surfaces covered with particulates.

DE 100 57 862 C1 has described various geometries for operating an arrangement of this type which are based on the principle of what are known as wall flow filters. These filters comprise parallel passages with a quadrilateral cross section which are alternately closed on the outlet side and the inlet side of the exhaust gas. This results in a division into inlet passages for the particulate-laden exhaust gas and outlet passages for the filtered exhaust gas. The particulates are deposited on the inner walls of the passages that are open on the inlet side and are oxidized there by oxygen and hydroxyl radicals which are produced in the immediate vicinity of the wall by non-thermal sliding surface discharge plasmas.

DE 100 57 862 C1 works on the basis that an electrode be arranged at each of the edges of a filter passage in order to produce sliding surface discharges. The electrodes required to produce plasma can either be embedded in the filter material or applied to the filter material, in such a way that in any event there is a layer with a high dielectric strength between an electrode connected to high voltage and the counterelectrode that is connected to ground. The embedding of the electrodes described in that document, however, means that sliding surface discharges can only be generated on both sides of the cell walls, whereas the particulates are only deposited on one side. This means that the specific energy consumption for the regeneration is twice as high as is actually necessary.

On the other hand, electrodes which are exposed to the exhaust gas and are proposed in that document in combination with embedded electrodes for the preferential operation of sliding surface discharges on one side of the wall, on account of being in contact with the exhaust gas are exposed to erosion processes which may be boosted still further by gas discharge processes. These erosion processes may not only have an adverse effect on the service life of the electrodes in particular, but also, via the formation of metal oxides, on the service life of the ceramic.

A further drawback is that the large number of electrodes—specifically four per inlet passage—significantly increases the size and weight of the plasma particulate filter compared to known filters.

The literature has disclosed geometries for the operation of dielectric barrier discharges in ceramic honeycomb bodies (cf. for example EP 0 840 838 B1), in which a cylindrical volume which includes a large number of passages could be excited by an internal high-voltage electrode and an external ground electrode. However, this means that it is not possible to differentiate between inlet and outlet passages of a particulate filter and also it is impossible to produce targeted sliding surface discharges. Moreover, the long sparking distance between the electrodes means that a high voltage amplitude of 20 kV is required, which can lead to problems in the motor vehicle.

SUMMARY OF THE INVENTION

Working on the basis of the latter related art, it is one possible object to provide a plasma particulate filter in which a suitable geometry avoids the drawbacks listed above.

The inventor proposes a wall flow filter comprising elongate passages of any desired cross section which are closed off on alternate sides, the particulate-covered walls of which wall flow filter are regenerated by sliding surface discharges. On account of the arrangement of the electrodes embedded in the filter material and thereby protected against corrosion, the sliding surface discharges now preferentially burn on the particulate-covered inlet side of the filter. The geometry indicated with two-line symmetry advantageously requires only two electrodes per inlet passage to produce the sliding surface discharges.

The wall flow filter has elongate passages with a quadrilateral cross section arranged in matrix form. The passages are closed off on alternate sides along a row or a column, so that inlet passages and outlet passages alternate.

The electrode arrangement may ensure that the distribution of the electric field in the individual cells of the plasma particulate filter allows non-thermal sliding surface discharges to be struck in individual cells. The dielectric properties of the wall material of the ceramic particulate filter are utilized to concentrate the field in cavities between the electrodes. Surprisingly, a reduction in the number of electrodes per inlet passage from four to two does not, for example, result in a deterioration of the electric field distribution with regard to the generation of sliding surface discharges. For this to be the case, it is important that the electrodes be arranged at diagonally opposite edges of the quadrilateral passage cross section, and it is necessary for inlet passages which are adjacent via their edges which are not provided with electrodes to be connected so as to have the same polarity.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
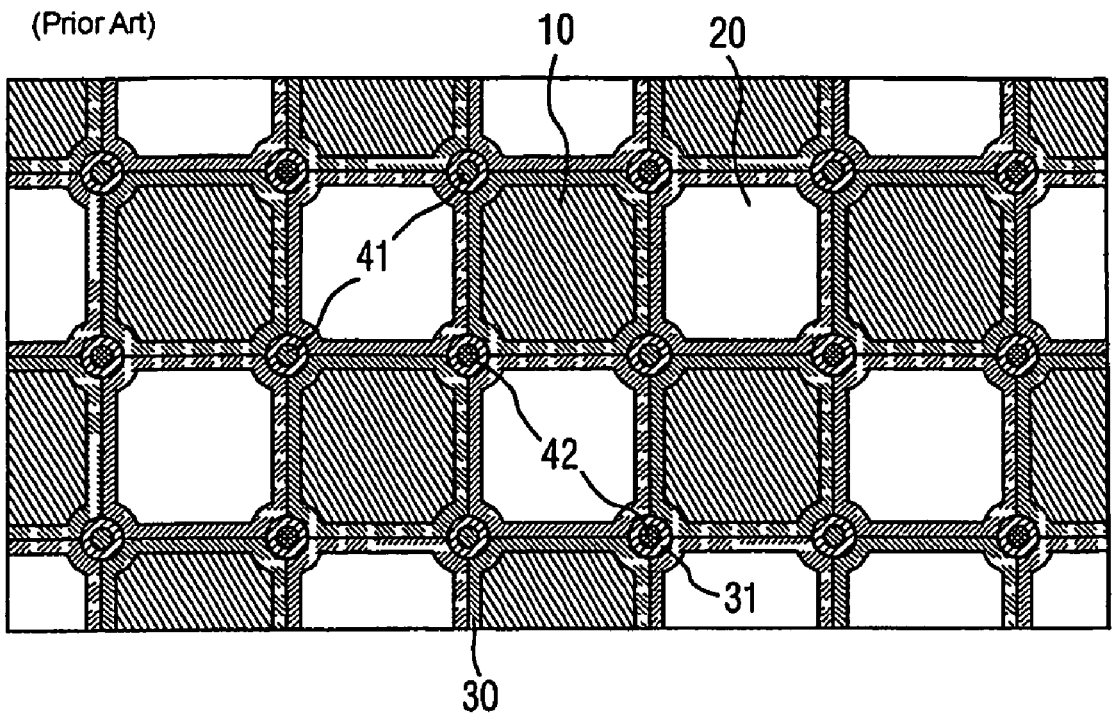
FIG. 1 and FIG. 3 show cross sections through plasma filter elements with inlet passages and outlet passages and associated electrodes.

Reference will now be made in detail to the preferred embodiments of the present invention, examples of which are illustrated in the accompanying drawings, wherein like reference numerals refer to like elements throughout.

The figures are in part described jointly below. In particular in connection with FIG. 1, reference is made in detail to patent DE 100 57 862 C1.

The latter patent protects a method and associated arrangements for lowering the levels of carbon-containing particulate emissions from diesel engines in which sliding surface discharges are used. FIGS. 1 to 5 and 7 to 12, which are described in detail in DE 100 57 862 C1, illustrate wall flow filters made from ceramic material composed of elongate passages which are closed off on alternate sides and have a special quadrilateral cross section with electrodes fitted at each of the corners.

FIG. 1 shows a cross section through an electrode arrangement of this type in a plasma filter element of known design with four electrodes per passage embedded in filter material.

In detail, an inlet passage is denoted by 10 and an outlet passage is denoted by 20. Inlet passage 10 and outlet passage 20 are separated by porous walls 30 made from specific ceramic material. Electrodes are fitted in the walls 30 at each of the corners of the passages 10, these electrodes, arranged in pairs next to one another, serving as a high-voltage electrode 41 and a grounded electrode 42. To ensure sufficient dielectric strength, the electrodes 41 and 42, made from electrically conductive material, are each surrounded by an electrically insulating barrier layer 31, which to enable it to withstand high voltages has a low porosity compared to the filter material of the walls 30.

Figure 2:
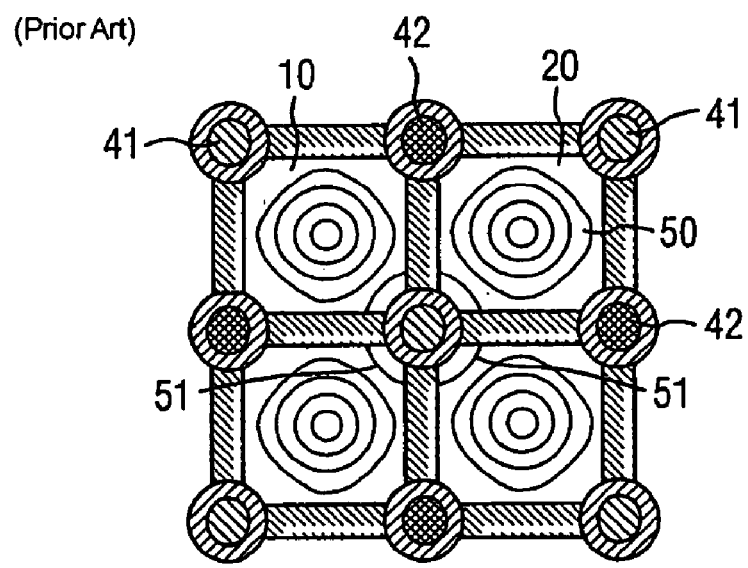
FIG. 2 and FIG. 4 show calculated field strength distributions in the arrangements shown in FIGS. 1 and 3.

FIG. 2 shows the distribution of the electric field strength, which is of importance to the formation of sliding surface discharges, for a voltage of 10 kV applied to the high-voltage electrodes in the case of a square passage cross section of 2×2 mm$^2$ in cross section through the arrangement shown in FIG. 1. 50 denotes calculated field minima in the arrangement shown in FIG. 1. On account of the quadrupole-like arrangement of the electrodes, these minima are in each case located on the axes of symmetry of both the inlet passages and the outlet passages. Regions with an elevated electric field strength 51, in which electric gas discharges are preferentially struck, are located in the vicinity of the passage walls of both the inlet passages and the outlet passages.

Overall, it can be seen from FIG. 2 that on account of the symmetry in the outlet passages 20, the same electric field distribution as in the inlet passages 10 results. However, for particulate oxidation in the wall flow filter, the regions of elevated electric field strength are actually only required in the inlet passages.

Figure 3:
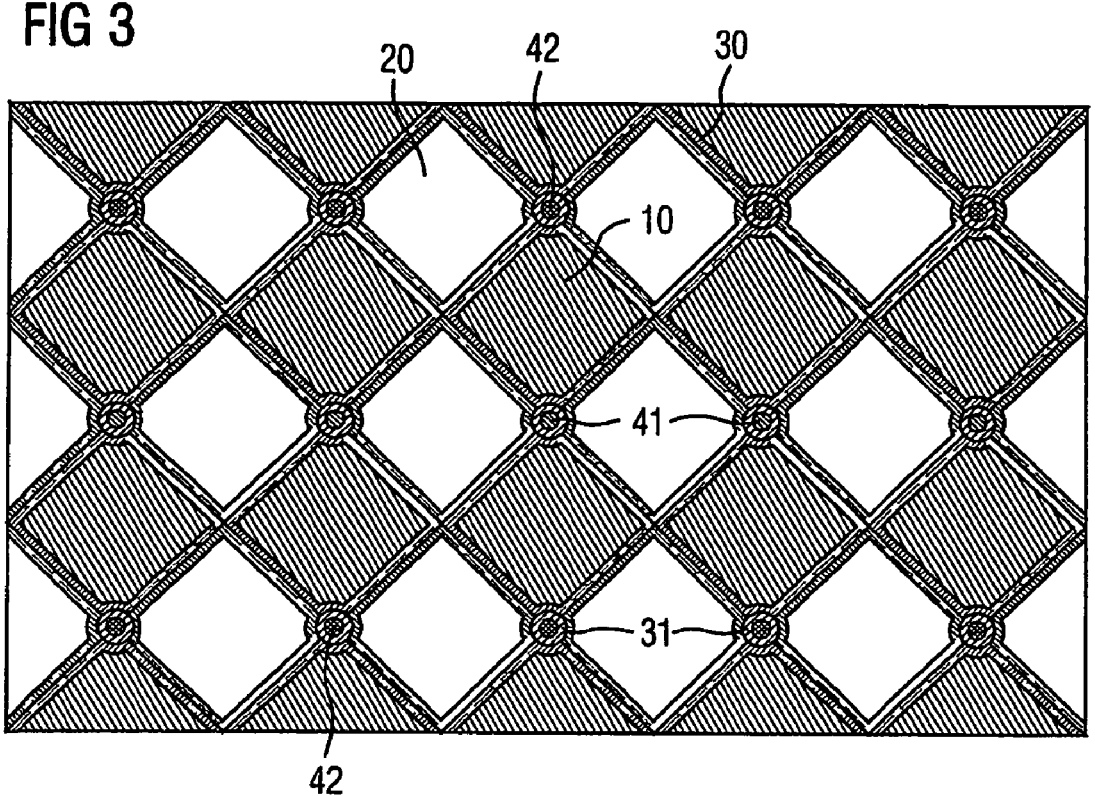

FIG. 3 shows an electrode arrangement for the selective production of gas discharges in the inlet passages, in cross section. The main difference with respect to FIG. 1 is the diamond-shaped arrangement of the inlet passages 10 and the outlet passages 20, which results from the structure shown in FIG. 1 being rotated through 45°. A further difference with respect to the related art is that electrodes 40, which are in this case designed in pairs as a high-voltage electrode 41 and a ground electrode 42, are in each case present at opposite corners of the diamond on the vertical at the inlet passages, which are now of diamond-shaped design. In this case too, for a porous filter material a barrier layer 31 is provided once again.

Figure 4:
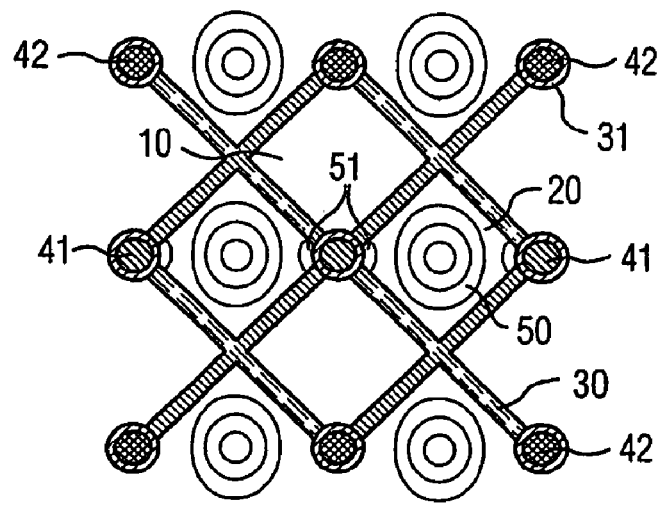

FIG. 4 shows the advantageous distribution of the electric field in the arrangement shown in FIG. 3, which allows the preferential ignition of gas discharges within the inlet passages. It is clear from this calculated illustration that compared to FIG. 2 the inlet passages 10 have an elevated electric field strength which is sufficient to ignite gas discharges over virtually the entire cross section, whereas in the outlet passages 20 the ignition of gas discharges is only likely in the vicinity of the electrodes, on account of slightly elevated electric fields. Otherwise, field minima 50 are once again present in accordance with FIG. 2.

Preferred attachment points for gas discharges in the inlet passages 10 are firstly in the vicinity of the electrodes on account of the elevated electric field strength being particularly pronounced there. However, since electric charge carriers are stored during operation of the gas discharge, and therefore the electric fields are reduced there, the preferred points of attachment for the gas discharges gradually slide along the walls of the inlet passages 10 toward the center region until the walls are covered with surface charges to such an extent that it is no longer possible to ignite any further gas discharges.

The latter process is associated with the formation of sliding surface discharges. Although the initial field distribution allows sliding surface and volume discharges equally, in this way, a not insignificant part of the electrical energy is converted into sliding surface discharges. At the same time, the operation of gas discharges in the outlet passages is substantially suppressed. This confirms that the arrangement shown in FIG. 3 gives an improved result, compared to FIG. 1, which corresponds to the related art, for the implementation of a plasma particulate filter with the use of sliding surface discharges for oxidation of the particulates.

The arrangement shown in FIG. 3, compared to FIG. 1, not only results in an electric field distribution which is advantageous for the efficient utilization of the electrical energy, but also results in a reduction of the materials and costs outlay as a result of a reduced number of electrodes per unit filter volume and area and, at the same time, a reduced electrical capacitance, which has the effect of reducing costs on account of simplification of the design of high-voltage grid parts for electrical excitation of the plasma particulate filter. In this context, it is important for the electrodes to be arranged at diagonally opposite edges of the quadrilateral passage cross section; inlet passages which are adjacent via their edges that are not provided with electrodes must necessarily be connected so as to have the same polarity.

Figure 5:
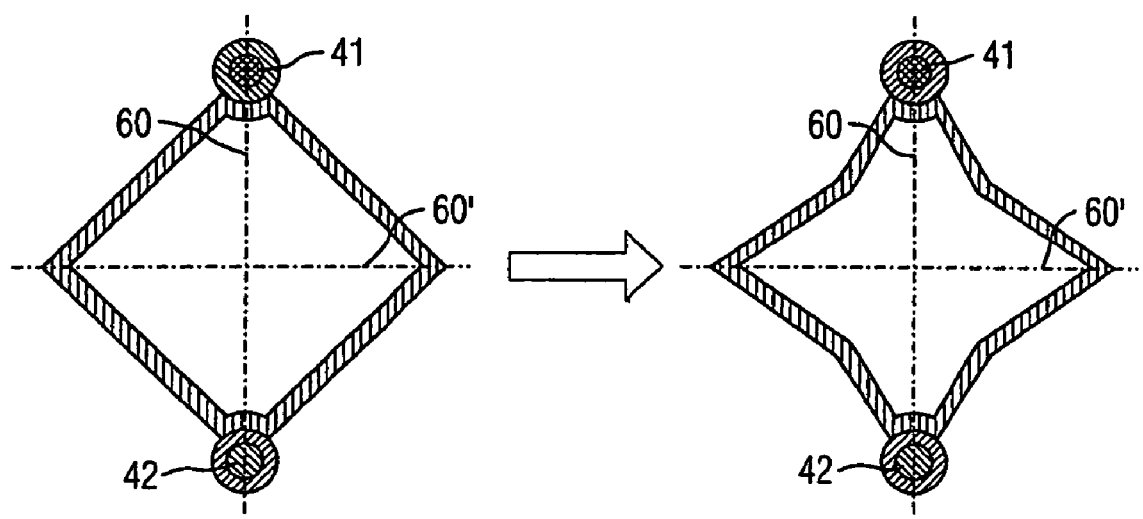
FIG. 5 shows cross sections through an inlet passage with two-line symmetry and its variation.

FIG. 5 shows, as an excerpt from FIG. 3, on the left-hand side the diamond-shaped cross section of an individual inlet passage with electrode 41, counterelectrode 42 and two axes 60 and 60' which define a two-line symmetry. These elements are of importance for the ability of the filter to function, the electrodes 41 and 42 being connected by the axis 60 as one line of symmetry.

It will be clear that the concept described can also be transferred to other passage cross sections. Working on the basis of the overall geometry shown in FIG. 3 and the specific symmetry presented in FIG. 5, the electrodes 41 and 42 and the connecting axis 60 between the electrodes 41 and 42, as a first line of symmetry, are held in place and the passage cross section is deformed symmetrically with respect to this axis. When the second line of symmetry is taken into account, the result, for example, is a star shape in the right-hand part of FIG. 5, in which the wall surface area which is active in the deposition of particulates is increased in the inlet passage compared to FIG. 3.

If the geometry in accordance with FIG. 5 is taken into account, the outlet passages are deformed in a correspondingly complementary way, so that the cross section is once again completely covered with inlet and outlet passages. In principle, any conversion of a quadrilateral into an n×quadrilateral with $n \geq 2$ is possible.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in Superguide v. DIRECTV, 69 USPQ2d 1865 (Fed. Cir. 2004).

The invention claimed is:

1. A plasma particulate filter comprising:
a mesh of ceramic filter material having a first set of walls extending in a first direction and a second set of walls extending in a second direction, the first set of walls intersecting the second set of walls to form substantially parallel inlet and outlet passages, the inlet and outlet passages being closed at alternate ends of the mesh, each passage having a cross section with four corners defined by intersections of the first and second set of walls; and
precisely two active electrodes provided for each inlet passage to oxidize particulates deposited within the inlet passage on the filter material within the inlet passage, the electrodes being formed at intersections of the first and second sets of walls such that for each inlet passage, an electrode is provided each of two diagonally opposing corners, the electrodes having opposite polarities, each electrode serving two inlet passages.

2. The plasma particulate filter as claimed in claim 1, wherein the electrodes are embedded in the filter material.

3. The plasma particulate filter as claimed in claim 1, wherein the electrodes are embedded in an electrically insulating barrier material of low porosity.

4. The plasma particulate filter as claimed in claim 1, wherein
the inlet passages each have a cross section with two-line symmetry and with n×4 corners, where n≧2, and
the n×4 corners are obtained by deformation of a quadrilateral cross section.

5. A plasma particulate filter based on a wall flow filter, comprising:
elongated inlet and outlet passages which are closed on alternate sides and which are made from ceramic filter material such that particulates are deposited on surfaces of the filter material within the inlet passages, the passages each having a cross section with two-line symmetry; and
precisely two electrodes of different polarity, lying on one of the lines of symmetry, per inlet passage, the electrodes regenerating the filter by oxidizing the particulates through dielectric barrier sliding surface discharges.

6. The plasma particulate filter as claimed in claim 5, wherein the electrodes are embedded in the filter material to protect the electrodes against erosion.

7. The plasma particulate filter as claimed in claim 5, wherein the electrodes are embedded in an electrically insulating barrier material of low porosity.

8. The plasma particulate filter as claimed in claim 5, wherein the electrodes are positioned to generate sliding surface discharges that selectively burn particulates on the inlet passages.

9. The plasma particulate filter as claimed in claim 5, wherein the cross section of the passages with two-line symmetry has a quadrilateral geometry, the two electrodes being arranged at opposite corners of the quadrilateral geometry.

10. The plasma particulate filter as claimed in claim 9, wherein the quadrilateral geometry is a vertically oriented diamond.

11. The plasma particulate filter as claimed in claim 10, wherein
the inlet passages have adjacent diamond-shaped cross sections,
electrodes are arranged at diagonally opposite corners of a plurality of diamond-shaped cross sections, and
for adjacent inlet passages, the electrodes at the corners are connected so as to have the same polarity.

12. The plasma particulate filter as claimed in claim 5, wherein
the inlet passages each have a cross section with two-line symmetry and with n×4 corners, where n≧2, and
the n×4 corners are obtained by deformation of a quadrilateral cross section while maintaining the electrodes on one of the lines of symmetry.

13. The plasma particulate filter as claimed in claim 6, wherein the electrodes are embedded in an electrically insulating barrier material of low porosity.

14. The plasma particulate filter as claimed in claim 13, wherein the electrodes are positioned to generate sliding surface discharges that selectively burn particulates on the inlet passages.

15. The plasma particulate filter as claimed in claim 14, wherein the cross section of the passages with two-line symmetry has a quadrilateral geometry, the two electrodes being arranged at opposite corners of the quadrilateral geometry.

16. The plasma particulate filter as claimed in claim 15, wherein the quadrilateral geometry is a vertically oriented diamond.

17. The plasma particulate filter as claimed in claim 16, wherein
the inlet passages have adjacent diamond-shaped cross sections,
electrodes are arranged at diagonally opposite corners of a plurality of diamond-shaped cross sections, and
for adjacent inlet passages, the electrodes at the corners are connected so as to have the same polarity.

18. The plasma particulate filter as claimed in claim 17, wherein
the inlet passages each have a cross section with two-line symmetry and with n×4 corners, where n≧2, and
the n×4 corners are obtained by deformation of a quadrilateral cross section while maintaining the electrodes on one of the lines of symmetry.

* * * * *